No. 793,253.  
Patented June 27, 1905.

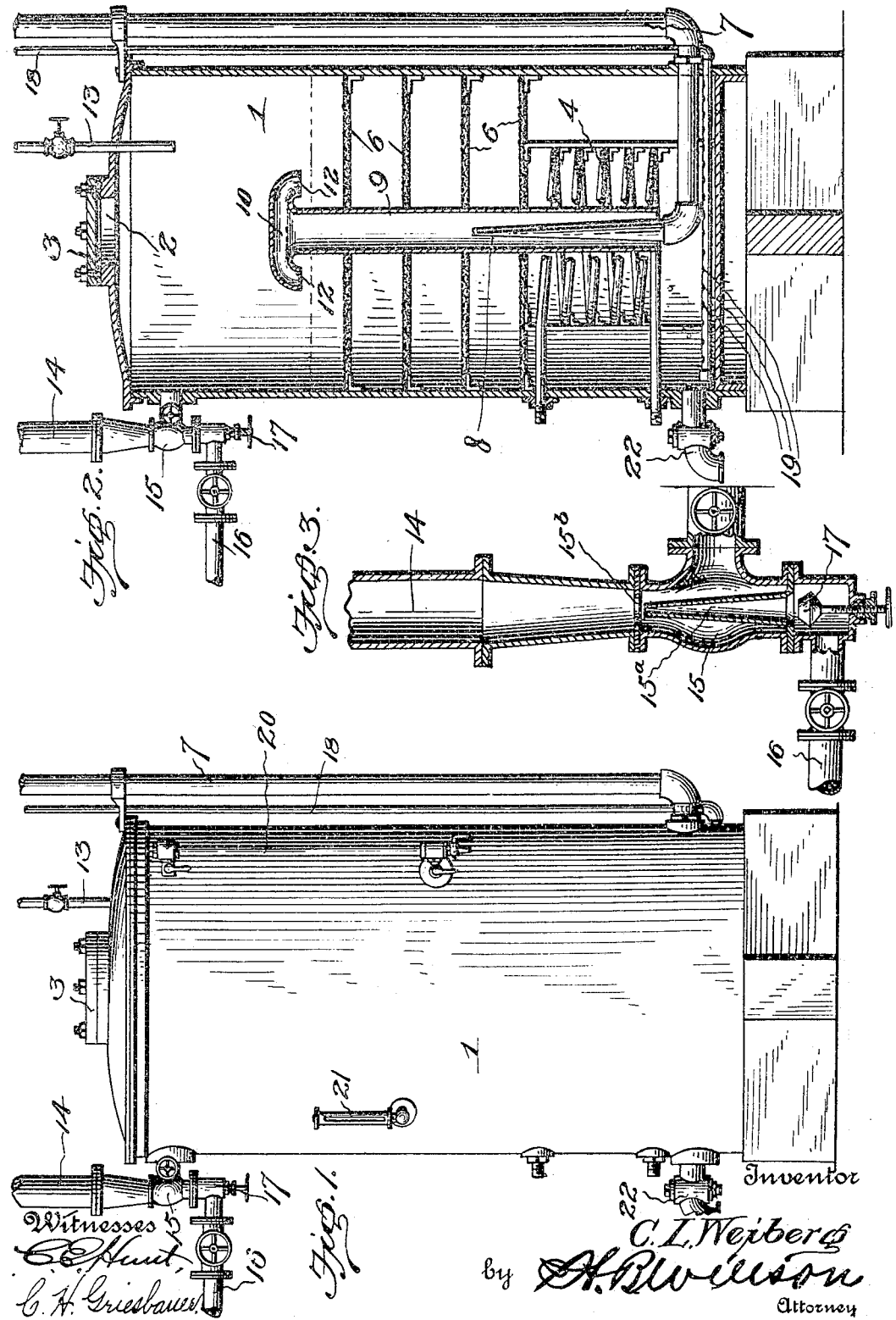

UNITED STATES PATENT OFFICE.

CONRAD L. WEIBERG, OF JACKSONVILLE, FLORIDA.

APPARATUS FOR BLEACHING OILS.

SPECIFICATION forming part of Letters Patent No. 793,253, dated June 27, 1905.

Application filed December 27, 1904. Serial No. 238,432.

*To all whom it may concern:*

Be it known that I, CONRAD L. WEIBERG, a citizen of the United States, residing at Jacksonville, in the county of Duval and State of Florida, have invented certain new and useful Improvements in Apparatus for Bleaching Oils; and I do declare the following to be a full, clear, and exact description of the invention, such as will enable others skilled in the art to which it appertains to make and use the same.

This invention relates to improvements in an apparatus for bleaching oils.

The object of the invention is to provide an apparatus whereby oils and fats may be thoroughly bleached and deodorized, and is particularly adapted for bleaching and deodorizing oils, such as cotton-seed oil and other oils to be used for edible purposes.

A further object is to provide an apparatus for bleaching and refining oils of this character, whereby the same will be kept pure and free from all impurities and by which the same will be made absolutely sweet and free from any disagreeable taste or odor.

With these and other objects in view the invention consists of certain novel features of construction, combination, and arrangement of parts, as will be hereinafter described and claimed.

In the accompanying drawings, Figure 1 represents a side view of an apparatus embodying my invention, Fig. 2 is a vertical sectional view of the same, and Fig. 3 is an enlarged detail sectional view through the suction-valve casing.

In the embodiment of the invention I provide a closed tank 1, on the upper end of which is formed a manhole 2, which is normally kept closed by means of an air-tight cover 3. Within the tank 1 is arranged a drying-coil 4, the upper and lower ends of which project through the sides of the tank 1, and to the projecting upper end of the coil is connected a steam-inlet pipe, and to the lower end of the same is connected a discharge-pipe, whereby steam may be forced through said coil, thus heating the interior of the tank. Above said coil is arranged, one above the other, a series of strainer-plates 6.

On the outside of the tank 1 is arranged a vertically-disposed air-pipe 7, which communicates with an air-pump. (Not shown.) The lower end of the pipe 7 enters the tank 1 at the lower end of the same and extends to the center of said tank, where it is provided with an upwardly-projecting elbow. Connected to said elbow is an upwardly-projecting nipple 8, said nipple being covered by a pipe 9, which is of sufficient size to form a space between the inner wall of the same and said nipple and has connected to its upper end a T 10. The open end of the T projects downwardly, as shown at 12, and is disposed immediately above the level of the oil in the tank.

Opening through the upper end of the tank 1 is a valved oil-supply pipe 13, by which oil is admitted into the tank. At one side and near the upper end of the tank is connected a discharge-pipe 14, whereby all moisture, damp air, or foul odors, &c., may be conducted from the tank. In the pipe 14, adjacent to its connection with the tank, is a suction-valve casing 15, with the lower end of which communicates a valved steam-inlet pipe 16. In the casing 15 is arranged a conical injector-nozzle $15^a$, the upper end of which opens adjacent to an apertured partition $15^b$, as shown, so that when steam is forced through the injector-nozzle $15^a$ from the pipe 16 and is discharged through the apertured partition $15^b$ into the discharge-pipe 14 a suction will be created through the valve-casing and pipe 14, which will draw all foul air and impurities from the tank 1.

In the lower end of the casing 15 is arranged a regulating-valve 17, which is adapted to be screwed into and out of engagement with the lower end of the injector-nozzle 15 to regulate the flow of steam through the same.

On one side of the tank 1 is arranged a high-pressure steam-pipe 18, the lower end of which enters through tank 1 immediately above the bottom of the same. Said lower end of the steam-pipe is provided with a series of discharge-openings 19, whereby steam may be discharged into said tank for the purpose of deodorizing the oil contained therein. On the outside of the tank 1 is arranged an oil-gage glass 20 and a thermometer 21.

The strainers 6 are formed of very fine steel-wire cloth, which will thoroughly break up the oil while the same is being forced therethrough, thus permitting the purifying properties of the chemicals used to reach all parts of the oil.

In the past and even up to the present time the manner of preparing oils and fats, and especially cotton-seed oil, for edible purposes has been done under very crude and unsanitary conditions, as the manufacture of the same has been by an open-kettle process with fullers' earth and other chemicals. The use of fullers' earth and other chemicals by this process is the cause of oxidation of the fats, which rapidly increases rancidity of the mass. The apparatus hereinbefore described avoids all such dangers, as the fats and oils which are to be used for edible purposes are treated by a vacuum process in an air-tight vessel, from which all foul air and other impurities are forced by the air-suction apparatus, as hereinbefore described.

The operation of the apparatus is as follows: The bleaching substances are first placed into the tank through the manhole at the top of the same, after which the manhole is closed air-tight. Steam is turned into the heating-coil 4 and also into the suction-valve 15, thereby a suction of air is created through the same and the discharge-pipe 14, thus drying the bleaching substances and removing from the same all impurities, this operation requiring about thirty minutes. After the bleaching substances have been thus purified oil will be pumped into the tank through the inlet-pipe 13 and will filter through the strainers 6 to the bottom of the tank. Air is now forced through the pipe 12 and the nipple 8, which will cause the oil to be sucked up through the pipe 9 and discharged upon the upper strainer 6 through the discharge ends of the T 10, thus causing a circulation of the oil back and forth through the strainers and the heating-coils, which will cause impurities and moisture to be separated therefrom, said moisture and volatile impurities being removed from the tank by the action of the steam through the suction-valve and discharge-pipe 14. The continual motion of the oil and the precipitation of the same upon the upper strainer-plate by the T 10 greatly facilitates the action of the purifying-chemicals and the removal of the impurities from the oil. After the oil has been properly bleached and purified the same will be drawn off from the tank 1 through a discharge-cock 22 and after being passed through a suitable filtering-press will be again pumped into the tank 1 to more fully neutralize and deodorize the same, which is accomplished by forcing the oil back and forth through the strainers 6 by the air from the pipe 12, as hereinbefore described, and by the application of steam under high pressure through the high-pressure steam-pipe 18 and the discharge-openings 19, formed therein. The foul orders which are separated from the oil by the high-pressure steam are removed from the tank by the action of the steam through the suction-valve 15 and discharge-pipe 14, as described in connection with the purifying process. The oil after being treated by the herein-described process and apparatus will be found to be absolutely neutral, sweet, and free from all disagreeable tastes and odors, thus forming a perfectly pure and wholesome article for edible purposes.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In an oil-bleaching apparatus, the combination with an air-tight tank, of a steam drying-coil arranged therein, strainers arranged above said coil, an oil-inlet pipe, an oil-discharge cock, an air-pipe arranged in said tank, a nipple connected to the end of said pipe, an oil-pipe arranged on said nipple whereby when air is forced through said nipple oil will be drawn through said pipe, means connected to the upper end of said oil-pipe whereby said oil will be precipitated upon the upper strainer of said series, and means whereby the moisture and volatile impurities separated from the oil and bleaching substances may be removed from said tank, substantially as described.

2. In an oil-bleaching apparatus, the combination with an air-tight tank, of a steam drying-coil arranged therein, strainers arranged above said coil, an oil-inlet pipe, an oil-discharge cock, an air-pipe arranged in said tank, a nipple connected to the end of said pipe, an oil-pipe arranged on said nipple whereby when air is forced through said nipple oil will be drawn through said pipe, a T having downwardly-opening ends whereby said oil will be precipitated upon said strainers, a discharge-pipe connected near the upper end of said tank, and means whereby air will be drawn from the latter and forced through said pipe, substantially as described.

3. In an oil-bleaching apparatus, the combination with an air-tight tank, of a drying-coil arranged therein, a series of strainers, means whereby said oil is circulated through said strainers, an oil-supply pipe, a discharge-pipe for impurities separated from said oil, a suction-valve arranged in said pipe, a valved steam-pipe connected to said suction-valve whereby steam may be forced through the same and through said discharge-pipe therebd drawing all impurities and moisture from saiy tank, a regulating-valve arranged in the connection of said steam-pipe, a discharge-cock arranged in the lower end of said tank, a high-pressure-steam-discharge pipe connected with said tank, and provided with a perforated discharge portion arranged within and near the lower end of the tank, substantially as described.

In testimony whereof I have hereunto set my hand in presence of two subscribing witnesses.

CONRAD L. WEIBERG.

Witnesses:
H. W. HARRINGTON,
W. A. LOGAN.